(12) United States Patent
Nagakura et al.

(10) Patent No.: US 12,000,491 B2
(45) Date of Patent: Jun. 4, 2024

(54) COMBINATION OF PISTON RINGS, AND COMBINATION STRUCTURE OF PISTON AND PISTON RINGS

(71) Applicant: TPR Co., Ltd., Tokyo (JP)

(72) Inventors: Hiroyuki Nagakura, Tokyo (JP); Shuichi Inamori, Tokyo (JP); Akira Hikone, Tokyo (JP)

(73) Assignee: TPR Co., Ltd., Tokyo (JP)

( * ) Notice: Subject to any disclaimer, the term of this patent is extended or adjusted under 35 U.S.C. 154(b) by 0 days.

(21) Appl. No.: 18/026,144

(22) PCT Filed: Jul. 30, 2021

(86) PCT No.: PCT/JP2021/028466
§ 371 (c)(1),
(2) Date: Mar. 14, 2023

(87) PCT Pub. No.: WO2023/007734
PCT Pub. Date: Feb. 2, 2023

(65) Prior Publication Data
US 2023/0358313 A1    Nov. 9, 2023

(51) Int. Cl.
*F16J 9/06* (2006.01)
*F16J 9/20* (2006.01)

(52) U.S. Cl.
CPC . *F16J 9/06* (2013.01); *F16J 9/20* (2013.01); *F16J 9/203* (2013.01)

(58) Field of Classification Search
CPC ........ F16J 9/20; F16J 9/06; F16J 9/206; F16J 9/203; F16J 9/00; F16J 9/16; F16J 9/064
See application file for complete search history.

(56) References Cited

U.S. PATENT DOCUMENTS 2,177,574 A * 10/1939 Malina ................. F16J 9/00
92/232
2,294,519 A    9/1942 Starr
2,938,758 A *  5/1960 Phillips ................ F16J 9/20
277/444
(Continued)

FOREIGN PATENT DOCUMENTS

CN    106402381 A    2/2017
CN    206054123 U    3/2017
(Continued)

OTHER PUBLICATIONS

Office Action in JP Application No. 2021-551964 dated Dec. 21, 2021, 10 pages.
(Continued)

*Primary Examiner* — Dustin T Nguyen
(74) *Attorney, Agent, or Firm* — MARSHALL, GERSTEIN & BORUN LLP (57) ABSTRACT

A combination of piston rings assembled to a piston includes a first compression ring, a second compression ring, a third compression ring and an oil ring. When an axial width of the first compression ring is h1(1), an axial width of the second compression ring is h1(2), an axial width of the third compression ring is h1(3) and an axial width of the oil ring is h1(4), h1(1)≥h1(2) and h1(1)≥h1(3), and when h1(TOTAL)=h1(1)+h1(2)+h1(3)+h1(4), h1(TOTAL)≥3.1 mm.

18 Claims, 7 Drawing Sheets

(56) References Cited

U.S. PATENT DOCUMENTS

| | | | | |
|---|---|---|---|---|
| 6,131,503 A | * | 10/2000 | Takashima | F02B 61/045 |
| | | | | 123/193.6 |
| 10,890,255 B2 | * | 1/2021 | Hoshino | F16J 9/06 |
| 2006/0113730 A1 | * | 6/2006 | Suzuki | F16J 9/062 |
| | | | | 277/434 |

FOREIGN PATENT DOCUMENTS

| | | |
|---|---|---|
| JP | S62-63460 U | 4/1987 |
| JP | 5-25024 B | 4/1993 |
| JP | 2021059983 A | 4/2021 |

OTHER PUBLICATIONS

Search Report in International Application No. PCT/JP2021/028466, dated Sep. 7, 2021, 2 pages.
Extended European Search Report in EP Application No. 21951933.7 dated Sep. 13, 2023, 12 pages.

\* cited by examiner

COMBINATION OF PISTON RINGS, AND COMBINATION STRUCTURE OF PISTON AND PISTON RINGS

TECHNICAL FIELD

The present invention relates to a combination of piston rings assembled to a piston in a spark ignition engine, and a combination structure of a piston and piston rings.

BACKGROUND ART

In an internal combustion engine mounted in a general automobile, a configuration is adopted in which a combination of piston rings including a compression ring (pressure ring) and an oil ring is fitted in a ring groove formed in a piston. In an axial direction of the piston, the compression ring is provided on a combustion chamber side, and the oil ring is provided on a crank chamber side. These rings exert abilities by sliding on an inner wall surface of a cylinder. The oil ring farthest from the combustion chamber has an oil seal function of inhibiting outflow of oil (oil rise) to the combustion chamber side by scraping off, to the crank chamber side, excess engine oil (lubricating oil) adhered on the inner wall surface of the cylinder, and a function of preventing the compression ring and piston from being burned in an operation of the internal combustion engine by adjusting an amount of oil to appropriately hold a lubricating oil film on the cylinder inner wall surface. The compression ring has a gas seal function of inhibiting outflow (blow-by) of combustion gas from the combustion chamber side to the crank chamber side by holding airtightness, and an oil seal function of suppressing oil rise by scraping off excess oil that cannot be completely scraped off with the oil ring. A spark ignition engine illustrated in a gasoline engine generally uses two compression rings and one oil ring.

In this connection, Patent Document 1 discloses that an internal combustion engine, including a plurality of piston rings assembled to a piston, includes a structure where a width of a closed gap in a piston ring is maximized in the piston ring of a top stage and reduced toward the piston ring of a lower stage. Accordingly, a force with which each ring is pressed against a cylinder liner is equal, and an amount of wear on each ring can be about the same.

CITATION LIST

[Patent Document]
[Patent Document 1] Japanese Utility Model Laid-Open No. 62-063460
[Patent Document 2] Japanese Patent Publication No. 5-025024

SUMMARY OF THE INVENTION

Problems to be Solved by the Invention

On the other hand, with increase in output of an internal combustion engine in recent years, measures in terms of environmental performance have become an urgent task. In particular, in a spark ignition engine exemplified by a gasoline engine with high cylinder inner pressure, which typically aims to increase output, reduction of blow-by gas is a critical issue, but it is necessary to reduce a weight of a piston, and hence it is difficult to consider increasing the number of compression rings.

On the other hand, in a compression ignition engine illustrated in a diesel engine, particularly in a large diesel engine, although a purpose is different, use of three or more compression rings enables maintaining a function of each compression ring for a long time even if wear or the like occurs on any ring, and maintenance frequency is reduced. However, in order to assemble the three or more compression rings to the piston, it is necessary to increase an axial length of the piston, so that the weight of the piston increases. In addition, the increase in the number of the compression rings for use also increases friction.

An object of the present invention, which has been made to solve such problems, is to provide a technology capable of reducing blow-by gas while suppressing an increase in friction and an increase in piston weight in a spark ignition engine illustrated in a gasoline engine.

Means for Solving the Problems

In order to solve the above problems, the present invention has a configuration in which three compression rings and one oil ring are assembled to a piston, but in order to suppress increase in friction and increase in piston weight in the configuration, a function of each compression ring, particularly a third ring (third compression ring) is focused. Specifically, blow-by gas can be reduced while suppressing the increase in friction by reducing a width of each compression ring while ensuring strength of the compression ring and by considering appropriate combination of axial widths and additionally appropriate distribution of tension. Furthermore, considering of volume distribution of a land space in addition to an axial length of each piston land portion enables reducing the blow-by gas while suppressing the increase in piston weight.

More specifically, the present invention is a combination of a plurality of piston rings assembled to a piston fitted in a cylinder in a spark ignition engine, the combination including a first compression ring assembled at a position closest to a combustion chamber, a second compression ring assembled at a position close to the combustion chamber next to the first compression ring, an oil ring assembled at a position farthest from the combustion chamber, and a third compression ring assembled at a position between the second compression ring and the oil ring, wherein when an axial width of the first compression ring is h1(1), an axial width of the second compression ring is h1(2), an axial width of the third compression ring is h1(3), and an axial width of the oil ring is h1(4), h1(1)≥h1(2) and h1(1)≥h1(3), and when h1(TOTAL)=h1(1)+h1(2)+h1(3)+h1(4), h1(TOTAL)≥3.1 mm.

In the present invention, it may be provided that when a tension of the first compression ring is Ft(1), a tension of the second compression ring is Ft(2), a tension of the third compression ring is Ft(3), a tension of the oil ring is Ft(4), and a diameter of a cylinder bore of the spark ignition engine is d1, Ft(1)>Ft(3), and when Ft(TOTAL)=Ft(1)+Ft(2)+Ft(3)+Ft(4), 0.68 N/mm≥Ft(TOTAL)/d1.

In the present invention, a torsional angle of the third compression ring may be 20'±40' in a state where the third compression ring is assembled to the piston and the piston is fitted in the cylinder.

In the present invention, the third compression ring may have an outer peripheral surface formed in a tapered shape or a tapered undercut shape.

In the present invention, it may be provided that 1.8 mm≥h1(1), 1.2 mm≥h1(2), and 1.0 mm≥h1(3).

In the present invention, the oil ring may include a pair of segments that are formed annularly along a circumferential direction of the oil ring and that are provided independently of each other and side by side in an axial direction of the oil ring, and a spacer expander that is disposed between the pair of segments.

Moreover, the present invention may be a combination structure of a piston and piston rings in a spark ignition engine, including the piston and the combination of the piston rings, the piston having an outer peripheral surface that is formed with a first ring groove in which the first compression ring is fitted, a second ring groove in which the second compression ring is fitted, a third ring groove in which the third compression ring is fitted, and an oil ring groove in which the oil ring is fitted, wherein when a length from an end face of the first ring groove on a combustion chamber side to an end face of the oil ring groove on a crank chamber side in an axial direction of the piston is Lp, Lp≥5.1 mm, and when a length, in the axial direction of the piston, of a second land portion that is a region defined by the first ring groove and the second ring groove in the outer peripheral surface of the piston is Lp2, and a length, in the axial direction of the piston, of a fourth land that is a region defined by the third ring groove and the oil ring groove is Lp4, Lp2>Lp4.

In the present invention, it may be provided that when a length, in the axial direction of the piston, of a third land portion that is a region defined by the second ring groove and the third ring groove in the outer peripheral surface of the piston is Lp3, Lp3≥Lp4, Lp3≥0.5 mm, and Lp4≥0.5 mm.

In the present invention, it may be provided that when a volume of a second space that is a space surrounded by the piston, the cylinder, the first compression ring and the second compression ring is V2, and a volume of a fourth space that is a space surrounded by the piston, the cylinder, the third compression ring and the oil ring is V4, V2>V4.

In the present invention, it may be provided that when a diameter of a cylinder bore of the spark ignition engine is d1 and Vp=(d1/2)$^2$×π×Lp, V4/Vp≥0.00027.

Effects of the Invention

According to the present invention, in a spark ignition engine, it is possible to reduce blow-by gas while suppressing increase in friction and increase in piston weight.

MODE FOR CARRYING OUT THE INVENTION

Hereinafter, a preferable embodiment of the present invention will be described with reference to the drawings. The embodiment described below is an application of a combination structure of a piston and piston rings according to the present invention to a spark ignition engine illustrated in a gasoline engine. The configuration described in the following embodiment is not intended to limit the technical scope of the invention to the embodiment unless otherwise described.

[Overall Configuration]

Figure 1:
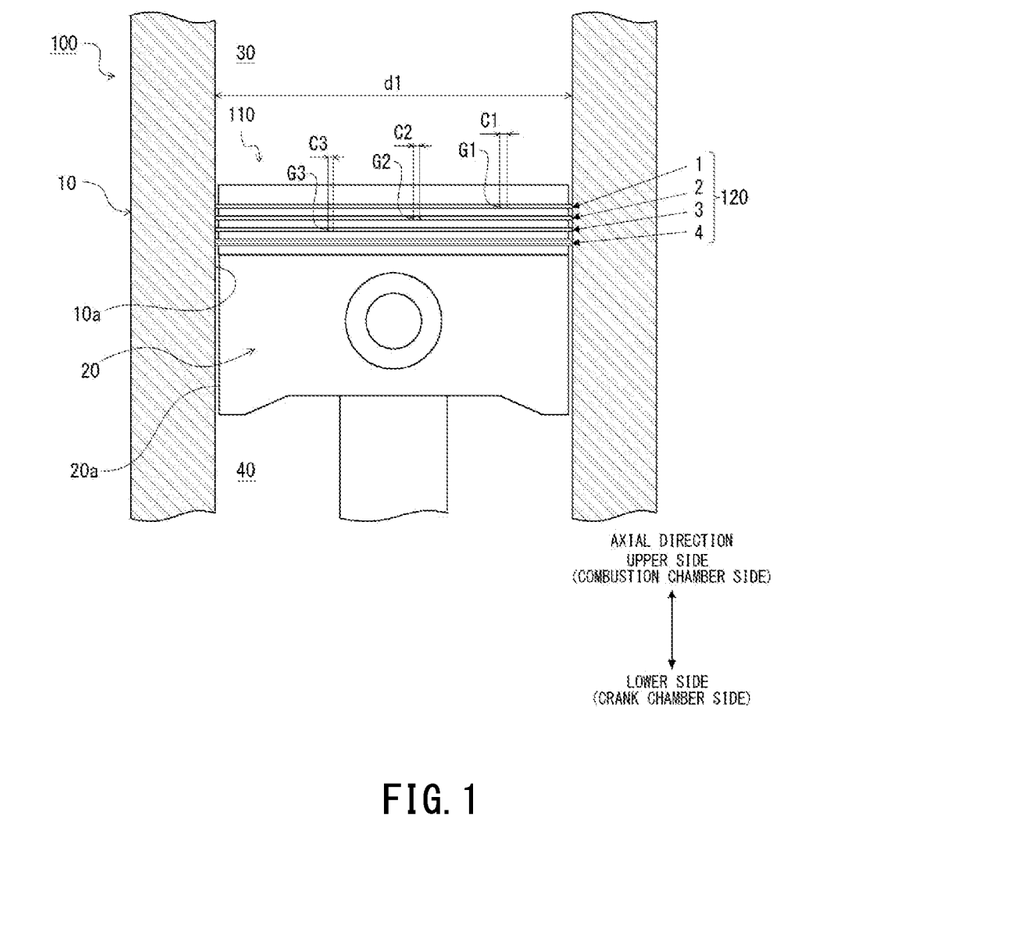
FIG. 1 is a view illustrating a part of a spark ignition engine including a piston structure according to an embodiment.
Figure 2:
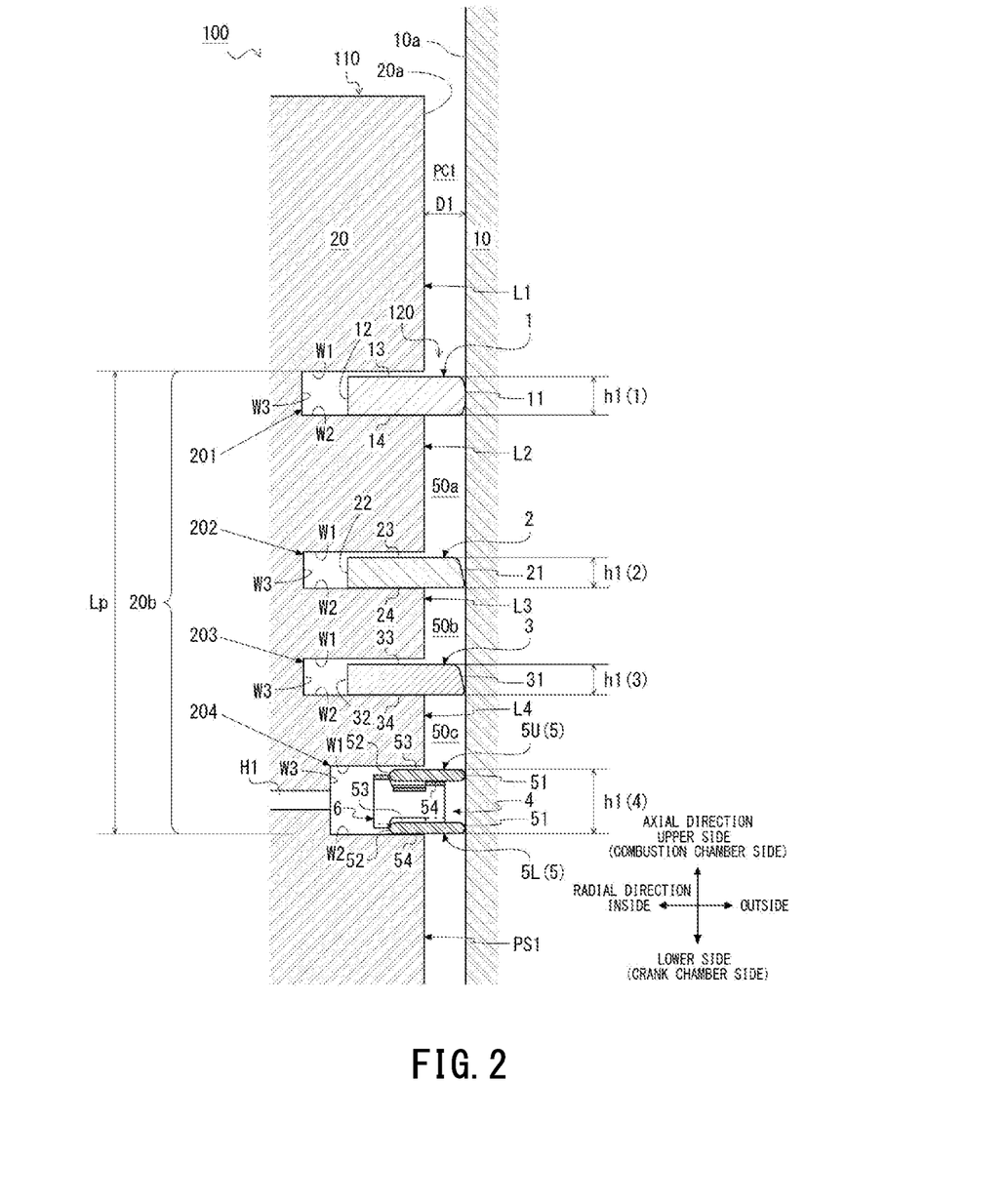
FIG. 2 is a partially cross-sectional view of the spark engine including the piston structure according to the embodiment.
Figure 3:
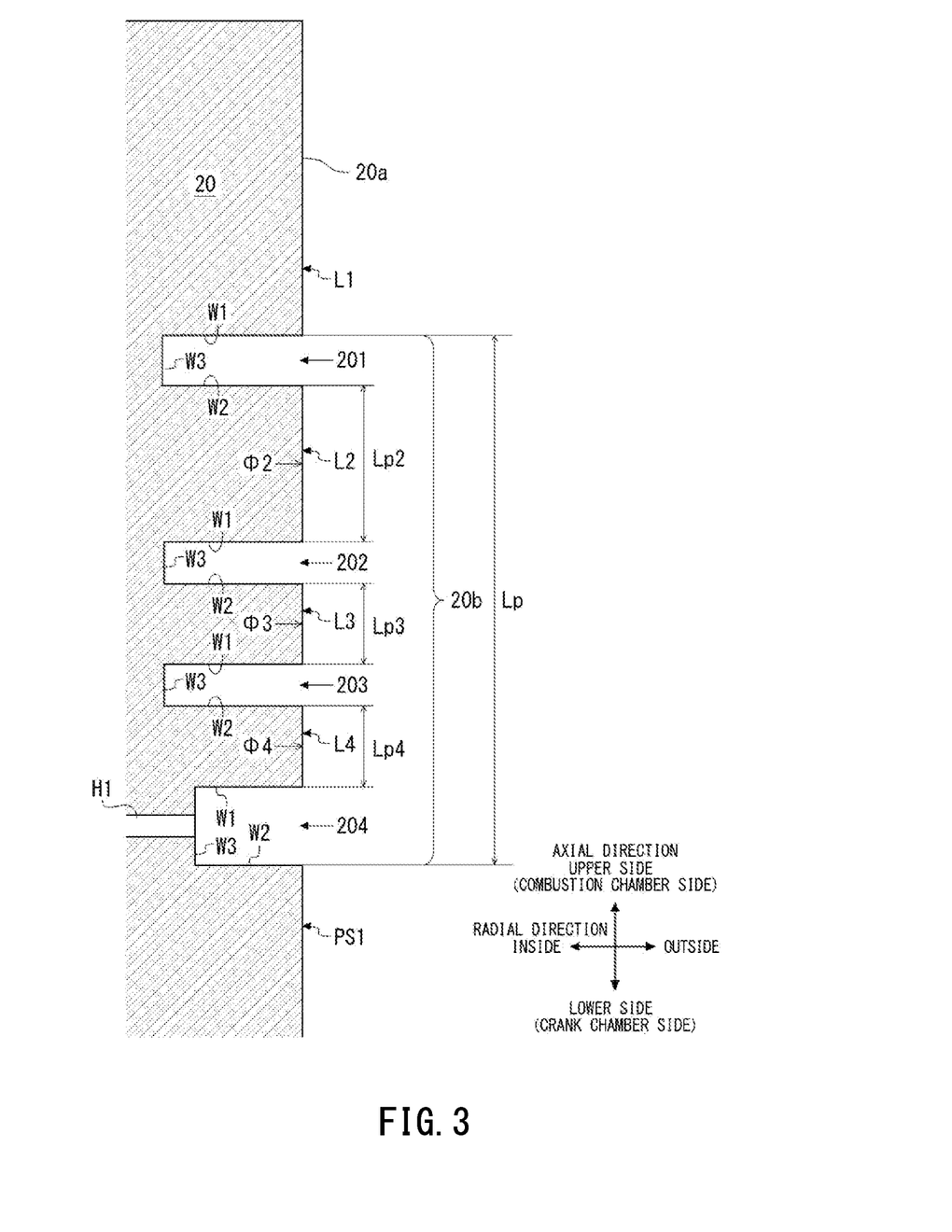
FIG. 3 is a partially cross-sectional view of a piston according to the embodiment.

FIG. 1 is a view illustrating a part of a spark ignition engine 100 including a combination structure (hereinafter, the piston structure) 110 of a piston and piston rings according to an embodiment. FIG. 2 is a partially cross-sectional view of the spark ignition engine 100 including the piston structure 110 according to the embodiment. FIG. 3 is a partially cross-sectional view of the piston 20 according to the embodiment. FIGS. 2 and 3 illustrate a cross section along a central axis of the piston. As illustrated in FIG. 1, the spark ignition engine 100 according to the embodiment includes a cylinder 10, the piston 20 fitted in the cylinder 10, and a piston ring combination 120 including a plurality of piston rings assembled to the piston 20. As illustrated in FIG. 2, in the spark ignition engine 100, a predetermined separation distance D1 is acquired between an outer peripheral surface 20a of the piston 20 and an inner wall surface 10a of the cylinder 10, so that a piston gap PC1 is formed. In the spark ignition engine 100, a combustion chamber side denoted with reference numeral 30 is an upper side, and a crank chamber side denoted with reference numeral 40 is a lower side. In the spark ignition engine 100, a configuration including the piston 20 and the piston ring combination 120 is the piston structure 110. Hereinafter, the piston structure 110 will be described.

[Piston]

As illustrated in FIG. 3, in the outer peripheral surface 20a of the piston 20, a first ring groove 201, a second ring groove 202, a third ring groove 203 and a fourth ring groove 204 are formed at predetermined intervals in an axial direction of the piston 20 in order from the upper side (combustion chamber 30 side). Hereinafter, when the first ring groove 201, the second ring groove 202, the third ring groove 203 and the fourth ring groove 204 are described without being distinguished, each of the grooves will be referred to simply as "the ring groove".

The ring groove is formed on an entire circumference of the outer peripheral surface 20a as the groove that extends annularly around an axis of the piston 20. As illustrated in FIG. 2, each ring groove is formed including a pair of groove walls (inner walls) arranged facing each other in an up-down direction. In the pair of groove walls, an upper groove wall is referred to as an upper wall W1, and a lower groove wall is referred to as a lower wall W2. Also, a groove wall connecting an inner peripheral edge of the upper wall W1 and an inner peripheral edge of the lower wall W2 in each ring groove is referred to as a bottom wall W3. Additionally, in the bottom wall W3 of the fourth ring groove 204, a drain hole H1 is formed for discharging, to the crank chamber 40, oil flowing into the fourth ring groove 204. However, the drain hole H1 does not have to be formed in the fourth ring groove 204.

As illustrated in FIG. 3, the ring grooves are formed in the piston 20, and accordingly in the piston 20, a first land portion L1, a second land portion L2, a third land portion L3, a fourth land portion L4 and a skirt portion PS1 are defined in order from the combustion chamber side. The first land portion L1 is a portion closer to the combustion chamber 30 side than the first ring groove 201. The second land portion L2 is a portion between the first ring groove 201 and the second ring groove 202. The third land portion L3 is a portion between the second ring groove 202 and the third ring groove 203. The fourth land portion L4 is a portion between the third ring groove 203 and the fourth ring groove 204. The skirt portion PS1 is a portion closer to the crank chamber 40 side than the fourth ring groove 204. Hereinafter, a length (axial length) of the second land portion L2 in the axial direction of the piston 20 is Lp2, an axial length of the third land portion L3 is Lp3, and an axial length of the fourth land portion L4 is Lp4. Further, a diameter of the piston 20 in the second land portion L2 is φ2, a diameter of the piston 20 in the third land portion L3 is φ3, and a diameter of the piston 20 in the fourth land portion L4 is φ4. Then, as illustrated in FIG. 3, in the piston 20, a region from the upper wall W1 that is an end face of the first ring groove 201 on the combustion chamber 30 side to the lower wall W2 that is an end face of the fourth ring groove 204 on the crank chamber 40 side is a ring fitting region 20b. Also, an axial length of the ring fitting region 20b is Lp.

[Piston Ring]

As illustrated in FIG. 2, in the piston structure 110 according to the embodiment, the combination 120 of four piston rings in total including three compression rings (pressure rings) of a top ring 1, a second ring 2 and a third ring 3 and one oil ring 4 is assembled to the piston 20. In the present description, when the top ring 1, the second ring 2, the third ring 3 and the oil ring 4 are described without being distinguished, each of the rings will be referred to simply as "the piston ring". The piston ring is a sliding member that is assembled to the piston fitted in a cylinder in an internal combustion engine and that slides on an inner wall surface of the cylinder with reciprocating motion of the piston. In the embodiment, the top ring 1 is fitted in the first ring groove 201, the second ring 2 is fitted in the second ring groove 202, the third ring 3 is fitted in the third ring groove 203, and the oil ring 4 is fitted in the fourth ring groove 204. Hereinafter, as illustrated in FIG. 2, a state where each piston ring is assembled to the piston 20 and the piston 20 is fitted in the cylinder 10 will be referred to as "a use state". Further, as illustrated in FIG. 2, a direction along a central axis of the piston ring (axial direction) is defined as "the up-down direction" of the piston ring. Further, in the axial direction of the piston ring, the combustion chamber 30 side (upper side in FIG. 2) in the spark ignition engine 100 is defined as "the upper side", and the opposite side, that is, the crank chamber side (lower side in FIG. 2) is defined as "the lower side". Also, in the present description, "a barrel shape" refers to a shape of an outer peripheral surface curved so as to be radially outward convex including a top having a maximum diameter in the piston ring, and includes a symmetric barrel shape with a top located in a center in the up-down direction, and an eccentric barrel shape with a top offset either upward or downward from a center in the up-down direction.

The top ring 1 is a compression ring assembled at a position closest to the combustion chamber 30 among the plurality of piston rings constituting the piston ring combination 120. The top ring 1 corresponds to an example of "a first compression ring" according to the present invention.

In the present example, a cross-sectional shape of the top ring 1 is a rectangular shape. The top ring 1 includes an outer peripheral surface 11, an inner peripheral surface 12, an upper surface 13 and a lower surface 14. The upper surface 13 and the lower surface 14 define a width of the top ring 1 in the axial direction. The outer peripheral surface 11 is formed in the barrel shape. The top ring 1 is assembled to the piston 20 in the spark ignition engine 100 so that when the upper surface 13, which is one of opposite end faces in the axial direction, faces the upper side and the other lower surface 14 faces the lower side, the outer peripheral surface 11 slides in contact with the inner wall surface 10a of the cylinder 10. Note that the shape of the first compression ring according to the present invention is not limited to the above. As the first compression ring, compression rings having various shapes can be adopted. For example, the first compression ring may have a straight shape or a tapered shape on an outer peripheral surface. The first compression ring may have a bevel shape, a keystone shape, or a half keystone shape as a cross-sectional shape.

The second ring 2 is a compression ring assembled at a position close to the combustion chamber 30 next to the top ring 1 among the plurality of piston rings constituting the piston ring combination 120. The second ring 2 corresponds to an example of "a second compression ring" according to the present invention.

In the present example, a cross-sectional shape of the second ring 2 is a rectangular shape similar to the top ring 1. The second ring 2 includes an outer peripheral surface 21, an inner peripheral surface 22, an upper surface 23 and a lower surface 24. The upper surface 23 and the lower surface 24 define a width of the second ring 2 in the axial direction. The outer peripheral surface 21 is formed in a tapered shape that is inclined so as to widen as being toward the lower side.

The third ring 3 is a compression ring assembled at a position between the second ring 2 and the oil ring 4. The third ring 3 corresponds to an example of "a third compression ring" according to the present invention. The third ring 3 includes an outer peripheral surface 31, an inner peripheral surface 32, an upper surface 33 and a lower surface 34. The upper surface 33 and the lower surface 34 define a width of the third ring 3 in the axial direction. The third ring 3 for use in this example has the same shape as in the second ring 2. That is, the third ring 3 in this example has a rectangular shape as a cross-sectional shape, and the outer peripheral surface 31 has a tapered shape.

Note that the shapes of the second compression ring and the third compression ring according to the present invention are not limited to the above. As the second compression ring and the third compression ring, compression rings having various shapes can be adopted. For example, the outer peripheral surface may have a barrel shape or a tapered shape. The cross-sectional shape may be a bevel shape, a keystone shape, a half keystone shape, or a scraper (step) shape. Further, the shapes of the respective compression rings may be different.

The top ring 1, second ring 2 and third ring 3 have self-tension to press the inner wall surface 10a of the cylinder 10 in the use state with each outer peripheral surface. Thereby, a gas seal function and an oil seal function can be obtained.

In FIG. 1, reference symbol G1 indicates a closed gap formed in the top ring 1, reference symbol G2 indicates a closed gap formed in the second ring 2, and reference symbol G3 indicates a closed gap formed in the third ring 3. A size of the closed gap G1 of the top ring 1 is C1, a size of the closed gap G2 of the second ring 2 is C2, and a size of the closed gap G1 of the third ring 3 is C3.

The oil ring 4 is a piston ring assembled at a position farthest from the combustion chamber 30 among the plurality of piston rings constituting the piston ring combination 120. The oil ring 4 in this example is a so-called three-piece combined oil ring, and includes a pair of segments 5, 5 and a spacer expander 6, as illustrated in FIG. 2.

The pair of segments 5, 5 are formed annularly along a circumferential direction of the oil ring 4 and are provided independently of each other and side by side in the axial direction. The oil ring 4 according to this example includes the pair of segments 5, 5 with the same shape. Hereinafter, when the pair of segments 5, 5 are referred to distinctively, the segment 5 provided on the upper side (combustion chamber 30 side) is referred to as an upper segment 5U, and the segment 5 provided on the lower side (crank chamber 40 side) is referred to as a lower segment 5L. These segments, which are not distinguished, are referred to simply as the segments 5. As illustrated in FIG. 2, each segment 5 includes an outer peripheral surface 51, an inner peripheral surface 52, an upper surface 53 and a lower surface 54. The upper surface 53 and the lower surface 54 define a width of the segment 5 in the axial direction. The outer peripheral surface 51 of the segment 5 is formed in a barrel shape (symmetric barrel). The segment 5 is assembled to the piston 20 in the spark ignition engine 100 so that when the upper surface 53, which is one of opposite end faces in the axial direction, faces the upper side and the other lower surface 54 faces the lower side, the outer peripheral surface 51 slides in contact with the inner wall surface 10a of the cylinder 10. The spacer expander 6 is provided between the pair of segments 5, 5 and has self-tension to expand the diameter in the use state. Thereby, the upper segment 5U and the lower segment 5L are biased radially outward by the spacer expander 6, and the outer peripheral surface 51 is pressed against the inner wall surface 10a of the cylinder 10. This can obtain an oil seal function.

Note that the shape of the oil ring according to the present invention is not limited to the above. In the embodiment, the pair of segments 5, 5 have the same shape, but in the present invention, the pair of segments may have different shapes. Further, a shape of an outer peripheral end face of the segment is not limited to a symmetric barrel shape, and may be an eccentric barrel shape, a tapered shape, or the like. Further, the pair of segments may have different outer peripheral shapes. The oil ring may be, for example, a so-called two-piece type oil ring. The oil ring may be in a form that does not include the spacer expander or a coil expander and functions as a single member.

Here, as illustrated in FIG. 2, an axial width of the top ring 1 is h1(1), an axial width of the second ring 2 is h1(2), an axial width of the third ring 3 is h1(3), and an axial width of the oil ring 4 is h1(4). A total of the axial widths of the compression rings is h1(COMP), and a total of the axial widths of the piston rings is h1(TOTAL). That is, h1(COMP)=h1(1)+h1(2)+h1(3), and h1(TOTAL)=h1(1)+h1(2)+h1(3)+h1(4).

[Land Space]

As illustrated in FIG. 2, a space between the inner wall surface 10a of the cylinder 10 and the outer peripheral surface 20a of the piston 20 is partitioned by the piston ring, so that a second land space 50a, a third land space 50b and a fourth land space 50c are formed.

The second land space 50a is a space surrounded by the cylinder 10, the piston 20, the top ring 1 and the second ring 2. In more detail, the second land space 50a is defined by the inner wall surface 10a of the cylinder 10, the outer peripheral surface 20a of the piston 20 in the second land portion L2, the lower surface 14 of the top ring 1 and the upper surface 23 of the second ring 2.

The third land space 50b is a space surrounded by the cylinder 10, the piston 20, the second ring 2 and the third ring 3. In more detail, the third land space 50b is defined by the inner wall surface 10a of the cylinder 10, the outer peripheral surface 20a of the piston 20 in the third land portion L3, the lower surface 24 of the second ring 2 and the upper surface 33 of the third ring 3.

The fourth land space 50c is a space surrounded by the cylinder 10, the piston 20, the third ring 3 and the oil ring 4. In more detail, the fourth land space 50c is defined by the inner wall surface 10a of the cylinder 10, the outer peripheral surface 20a of the piston 20 in the fourth land portion L4, the lower surface 34 of the third ring 3 and the upper surface 53 of the upper segment 5U of the oil ring 4.

Here, a volume of the second land space 50a is V2, a volume of the third land space 50b is V3, and a volume of the fourth land space 50c is V4. The volume of each land space is derived based on an inner diameter of the cylinder 10, an outer diameter of the piston 20, a distance between adjacent ring grooves (axial length of each land portion), and the like. Specifically, when a diameter of a cylinder bore (inner diameter of the cylinder 10) is d1 as illustrated in FIG. 1, $V2=((d1/2)^2-(\phi2/2)^2)\times\pi\times Lp2$, $V3=((d1/2)^2-(\phi3/2)^2)\times\pi\times Lp3$ and $V4=((d1/2)^2-(\phi4/2)^2)\times\pi\times Lp4$ can be represented. In addition, a cutout portion such as a recess or a chamfered portion may be formed in each land portion. Thereby, the volume of each land space can be adjusted. The volume of each land space also includes a volume of the cutout portion such as a recess or a chamfered portion.

Figure 4:
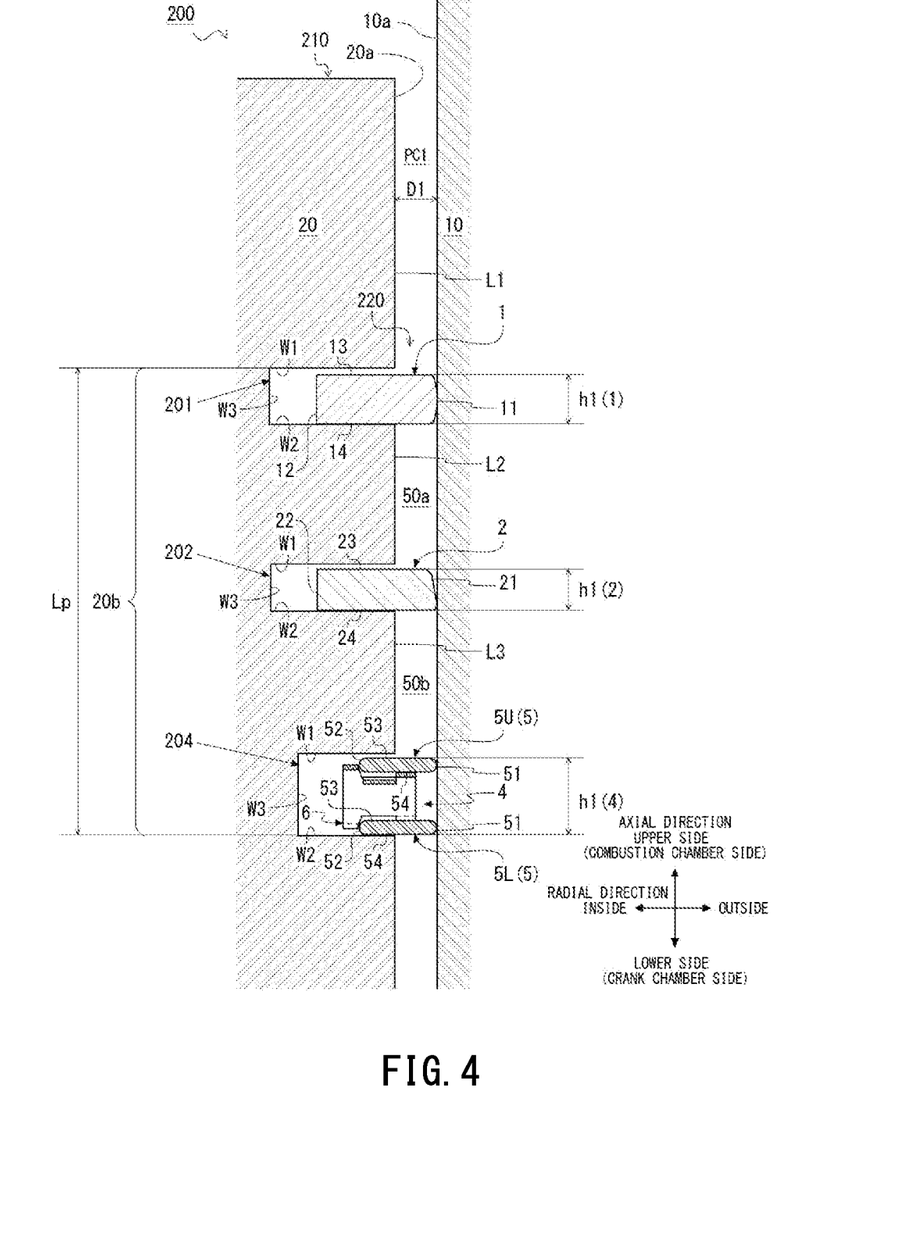
FIG. 4 is a partially cross-sectional view of a spark ignition engine including a piston structure according to a comparative example.

FIG. 4 is a partially cross-sectional view of a spark ignition engine 200 including a piston structure 210 according to a comparative example. The piston structure 210 according to the comparative example is different from the piston structure 110 in that a third ring groove 203 is not formed in a piston 20, and a piston ring combination 220 assembled to the piston 20 does not include a third ring 3. Therefore, a third land space 50b of the piston structure 210 is defined by a second ring 2 and an oil ring 4. In the piston structure 210, a fourth land space 50c is not formed.

Here, in the spark ignition engine, a pressure in a second land space close to a combustion chamber tends to be higher than a pressure in the third land space, but if a pressure difference is large, gas flowing into the second land space passes through a closed gap of the second ring and easily flows out to the third land space, which is a factor of increase in blow-by gas. In particular, in the spark ignition engine having a high cylinder inner pressure to achieve high output, the tendency is remarkable.

On the other hand, in the piston structure 110 according to the embodiment, the third ring 3 is assembled between the second ring 2 and the oil ring 4, so that the second ring 2 and the third ring 3 define the third land space 50b. Therefore, in the embodiment, compared to the piston structure 210 according to the comparative example in which the compression ring is not assembled between the second ring and the oil ring, the third ring 3 seals the gas, and a pressure in the third land space 50b can be accordingly increased. Thereby, compared to the piston structure 210 according to the comparative example, a pressure difference between the second land space 50a and the third land space 50b can be reduced, and outflow of gas from the second land space 50a to the third land space 50b can be suppressed. As a result, the blow-by gas can be reduced. That is, the piston structure 110 can enhance so-called labyrinth effect, and improve a gas seal performance by increasing the number of compression rings to be assembled between the top ring 1 and the oil ring 4 from one to two and accordingly reducing the pressure difference between the second land space 50a and the third land space 50b.

Furthermore, in the piston structure 110 according to the embodiment, a thin compression ring is used, and three compression rings can be accordingly assembled without making the axial length Lp of the ring fitting region 20b longer than that of the comparative example. That is, it is not necessary to increase the axial length of the piston 20. This can reduce the blow-by gas while suppressing increase in weight of the piston 20.

EXAMPLE

Table 1 illustrates axial widths of respective piston rings and axial lengths of respective land portions in combination structures of pistons and the piston rings according to Examples 1 to 4 of the present invention and Comparative Examples 1 to 4.
[Table 1]

TABLE 1

|  | Example 1 | Example 2 | Example 3 | Example 4 | Comparative Example 1 | Comparative Example 2 | Comparative Example 3 | Comparative Example 4 |
|---|---|---|---|---|---|---|---|---|
| Axial width of top ring: h1 (1) | 0.7 | 1.2 | 1.5 | 1.8 | 0.7 | 1.2 | 1.5 | 1.8 |
| Axial length of second land portion: Lp 2 | 1 | 2.5 | 4 | 6.5 | 1.6 | 3.5 | 5.8 | 9 |
| Axial width of second ring: h1 (2) | 0.6 | 1 | 1.2 | 1.2 | 0.6 | 1 | 1.2 | 1.2 |
| Axial length of third land portion: Lp 3 | 0.5 | 1.4 | 3 | 5.5 | 1 | 2.7 | 4.5 | 7.5 |
| Axial width of third ring: h1 (3) | 0.6 | 1 | 1 | 1 | — | — | — | — |
| Axial length of fourth land portion: Lp 4 | 0.5 | 1.3 | 2.3 | 3.5 | — | — | — | — |
| Axial width of oil ring: h1 (4) | 1.2 | 1.5 | 2 | 4 | 1.2 | 1.5 | 2 | 4 |
| Axial length of ring fitting region: Lp | 5.1 | 9.9 | 15 | 23.5 | 5.1 | 9.9 | 15 | 23.5 |
| Total of axial widths of piston rings: h1 (TOTAL) | 3.1 | 4.7 | 5.7 | 8 | 2.5 | 3.7 | 4.7 | 7 |
| Total of axial widths of compression rings: h1 (COMP) | 1.9 | 3.2 | 3.7 | 4 | 1.3 | 2.2 | 2.7 | 3 |

Examples 1 to 4 are configured in the same manner as in the piston structure 110 illustrated in FIGS. 1 to 3. Comparative Examples 1 to 4 are configured in the same manner as in the piston structure 210 illustrated in FIG. 4. As illustrated in Table 1, the axial length Lp of the ring fitting region 20b is approximated by a total value of the axial width h1(1) of the top ring 1, the axial length Lp2 of the second land portion L2, the axial width h1(2) of the second ring 2, the axial length Lp3 of the third land portion L3, the axial width h1(3) of the third ring 3, the axial length Lp4 of the fourth land portion L4 and the axial width h1(4) of the oil ring 4.

As illustrated in Table 1, in the piston structures of Examples 1 to 4, h1(1)≥h1(2), h1(1)≥h1(3), and h1(TOTAL)≥3.1 mm. The top ring 1 is assembled at the position closest to the combustion chamber among the three compression rings, and is therefore the compression ring with the largest load due to the pressure of combustion gas. In Examples 1 to 4, h1(TOTAL), which is a total of the axial widths of the respective piston rings, is set to 3.1 mm or more, while the axial width h1(1) of the top ring 1 is maximized among the three compression rings, so that strength of the top ring 1 can be acquired. Accordingly, these widths can be reduced while acquiring the strength of each piston ring. Further, by making the second ring 2 and the third ring 3 thinner than the top ring 1, the second ring 2 and the third ring 3 can be reduced in weight. In the present invention, h1(1)>h1(2) may be provided as in Examples 1 to 4. Furthermore, in the piston structures of Examples 2 to 4, h1(TOTAL)≥4.7 mm, to further increase the strength of each piston ring. However, the present invention is not limited thereto.

In the piston structures of Examples 1 to 4, 10 mm≥h1 (TOTAL). By making each piston ring thinner so that h1(TOTAL) is 10 mm or less, it is possible to inhibit the axial length Lp of the ring fitting region 20b from being increased. As a result, while suppressing the increase in weight of the piston 20, it is possible to reduce blow-by gas by three compression rings. Furthermore, in the piston structures of Examples 1 to 4, 8 mm≥h1(TOTAL), which further suppresses the increase in weight of the piston 20. Also, in the piston structures of Examples 1 to 4, by making each compression ring thinner, 4 mm≥h1(COMP), which acquires the suppression of the increase in weight of the piston 20. In particular, in the piston structures of Examples 1 to 3, 3.7 mm≥h1(COMP), which further suppresses the increase in weight of the piston 20. However, the present invention is not limited thereto.

Further, in the piston structures of Examples 1 to 4, 1.8 mm≥h1(1), 1.2 mm≥h1(2), and 1.0 mm≥h1(3). By making each compression ring thin in this manner, the axial length Lp of the ring fitting region 20b can be further reduced. Further, the third ring 3 is reduced in thickness and weight, which can reduce an inertial force of the third ring 3. This can reduce lifting of the third ring 3, and enhance the seal performance of the lower surface 34 of the third ring 3. However, the present invention is not limited thereto.

Additionally, in the piston structures of Examples 1 to 4, Lp≥5.1 mm and Lp2>Lp4. The axial length Lp of the whole ring fitting region 20b is set to 5.1 mm or more, and the axial length Lp2 of the second land portion L2 that is closer to the combustion chamber and requires higher strength is set to be longer than the axial length Lp4 of the fourth land portion L4, which can acquire the strength of each land portion. Further, by setting Lp2>Lp4, V2>V4 can be set as described later. As in Examples 2 to 4, it may be provided that Lp≥9.9 mm. This can increase the strength of each land portion. However, the present invention is not limited thereto.

Also, in the piston structures of Examples 1 to 4, 23.5 mm≥Lp. The widths of each compression ring and each land portion are decreased and Lp is set to 23.5 mm or less, which can suppress the increase in weight of the piston 20. However, the present invention is not limited thereto.

Further, in the piston structures of Examples 1 to 4, Lp3≥Lp4, Lp3≥0.5 mm, and Lp4≥0.5 mm. The axial length Lp3 of the third land portion L3 that is closer to the combustion chamber than the fourth land portion L4 is set to be larger than the axial length Lp4 of the fourth land portion L4, and Lp3 and Lp4 are set to 0.5 mm or more, which can suitably acquire strengths of the third land portion L3 and the fourth land portion L4. However, the present invention is not limited thereto.

Additionally, as described above, in the piston structures of Examples 1 to 4, Lp2>Lp4 is set, thereby resulting in V2>V4. Accordingly, the volume V4 of the fourth land space 50c far from the combustion chamber is set to be smaller than the volume V2 of the second land space 50a, so that a pressure difference between adjacent land spaces can be reduced compared to a case where V4 is larger than V2. Accordingly, gas flowing from the second land space 50a to the third land space 50b and gas flowing from the third land space 50b to the fourth land space 50c can be reduced. However, the present invention is not limited thereto.

Figure 5:
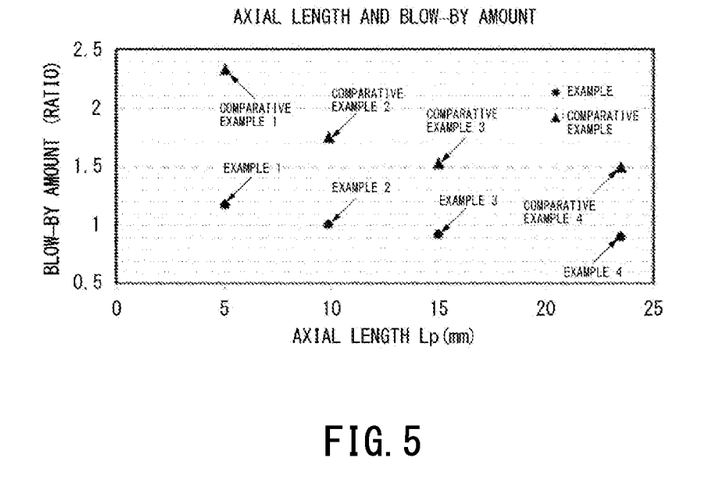
FIG. 5 is a graph comparing a blow-by amount of a piston structure according to an example with that of the piston structure according to the comparative example.

FIG. 5 is a graph comparing blow-by amounts of the piston structures according to Examples 1 to 4 with those of the piston structures according to Comparative Examples 1 to 4. In FIG. 5, a horizontal axis indicates the axial length Lp of the ring fitting region, and a vertical axis indicates a ratio of the blow-by amounts. As illustrated in FIG. 5, the amount of the blow-by gas in the example is smaller than that in the comparative example.

Additionally, in the embodiment, when $Vp=(d1/2)^2 \times \pi \times Lp$, it is preferable to set $V4/Vp \geq 0.00027$. However, the present invention is not limited thereto. Vp indicates a volume of a cylinder bore in the ring fitting region 20b. It is set that $V4/Vp \geq 0.00027$, so that a pressure in the fourth land space 50c can be inhibited from rising excessively. This can reduce the lifting of the third ring 3, and enhance the seal performance of the lower surface 34 of the third ring 3.

Here, a tension of the top ring 1 is Ft(1), a tension of the second ring is Ft(2), a tension of the third ring is Ft(3), a tension of the oil ring 4 is Ft(4), and it is set that Ft(TOTAL)=Ft(1)+Ft(2)+Ft(3)+Ft(4). That is, Ft(TOTAL) is the total of the tensions of the respective piston rings. At this time, from the viewpoint of friction reduction, it is preferable that Ft(1)>Ft(3) and that 0.68 N/mm≥Ft(TOTAL)/d1. However, the present invention is not limited thereto. Accordingly, the tension Ft(1) of the top ring 1 closest to the combustion chamber 30 is set to be larger than the tension Ft(3) of the third ring 3, so that a blow-by gas reduction performance can be suitably kept. Also, with 0.68 N/mm≥Ft(TOTAL)/d1, although four piston rings are used, the same degree of friction as in the conventional piston structure where three piston rings are used can be made. That is, increase in friction can be suppressed. From the viewpoint of the friction reduction, it is more preferable that 0.57 N/mm≥Ft(TOTAL)/d1, and it is further preferable that 0.54 N/mm≥Ft(TOTAL)/d1.

Figure 6:
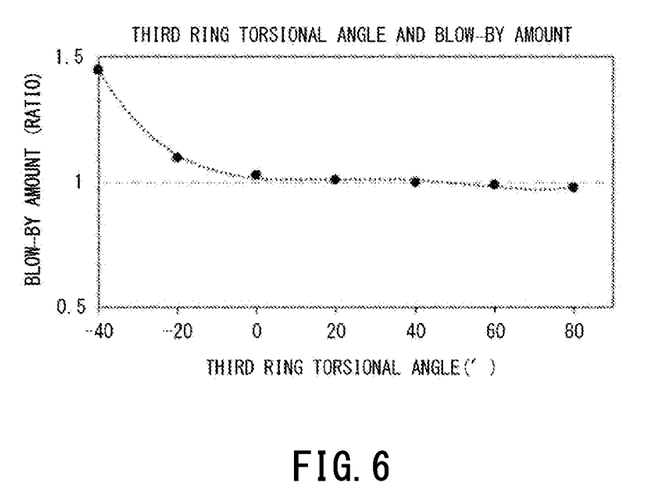
FIG. 6 is a graph illustrating a relation between a torsional angle of a third ring and the blow-by amount.
Figure 7:
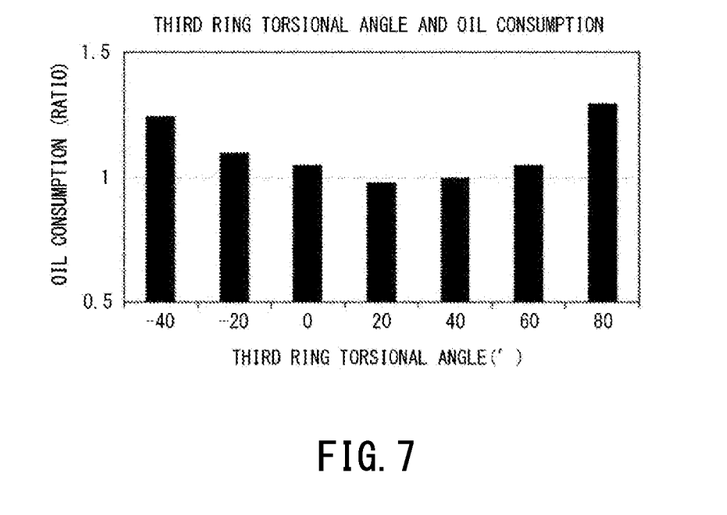
FIG. 7 is a graph illustrating a relation between the torsional angle of the third ring and oil consumption.

Further, from the viewpoint of the seal performance of the third ring 3, it is preferable that a torsional angle of the third ring 3 is 20'±40' in a use state where the third ring 3 is assembled to the piston 20 and the piston 20 is fitted in the cylinder 10. The torsional angle is defined as an inclination angle of an axial end face (upper/lower surface) of the third ring 3 relative to a horizontal plane (plane orthogonal to the axis of the piston). The angle indicates a positive value in a case where the axial end face inclines upward (combustion chamber side) toward outside in a radial direction, and the angle indicates a negative value in a case where the axial end face inclines downward (crank chamber side) toward outside in the radial direction. Further, for measurement of the torsional angle, for example, a method may be used including measuring the axial end face by use of a surface roughness meter or the like in a state where the third ring 3 with a closed fitting opening is inserted into a measuring ring gauge having a diameter equal to the diameter d1 of the cylinder bore, and calculating the torsional angle. In the embodiment, the third ring 3 has torsion in the above range, so that when the third ring 3 is subjected to pressure in the third land space 50b, the seal performance of the lower surface 34 of the third ring 3 can be enhanced. FIG. 6 is a graph illustrating a relation between the torsional angle (torsion amount) of the third ring 3 and the blow-by amount. In FIG. 6, a horizontal axis indicates the torsional angle of the third ring 3, and a vertical axis indicates a ratio of the blow-by amount. As illustrated in FIG. 6, in a range of the torsional angle of −20' to 80', the gas seal performance of the third ring is fully exerted, and the blow-by gas is noticeably reduced. FIG. 7 is a graph illustrating a relation between the torsional angle (torsion amount) of the third ring 3 and oil consumption. In FIG. 7, a horizontal axis indicates the torsional angle of the third ring 3, and a vertical axis indicates a ratio of oil consumption. Also, as illustrated in FIG. 7, if the torsional angle has a larger minus value than ~20' or a larger plus value than 60', the oil seal performance of the third ring 3 is not fully exerted, and there is a tendency for oil consumption to worsen. From the above, by setting the torsional angle of the third ring 3 to 20'±40', the seal performance of the third ring 3 can be suitably enhanced, and the blow-by gas and oil consumption can be reduced. Note that the torsional angle of the third compression ring according to the present invention is not limited to 20'±40'.

Here, since the third ring 3 is provided, the blow-by gas is reduced by the gas seal performance of the third ring 3. When the oil rises on the combustion chamber side above the third ring 3, it becomes difficult to blow down oil with an effect of the blow-by gas blowing down the oil, and the oil consumption might increase. On the other hand, in the piston structure 110 according to the embodiment, a shape of the outer peripheral surface 31 of the third ring 3 is a tapered shape with a high oil scraping performance. Accordingly, since the oil is less likely to rise on the combustion chamber side above the third ring 3, the oil consumption can be suppressed. From the viewpoint of improving the oil scraping performance, the outer peripheral surface 31 of the third ring 3 may have a tapered undercut shape that is inclined so as to widen as being toward the lower side and has a lower portion cut out. Furthermore, a shape of the outer peripheral surface 51 of at least one of the pair of segments 5, 5 of the oil ring 4 may be an eccentric barrel shape with the high oil scraping performance. Thereby, oil is further inhibited from rising on the combustion chamber side above the third ring 3, and the oil consumption can be more suitably suppressed. However, the present invention is not limited thereto.

Also, in the piston structure 110 according to the embodiment, the size C1 of the closed gap G1 of the top ring 1 and the size C3 of the closed gap G3 of the third ring 3 may have a relation of C1≥C3. This can enhance the gas seal performance of the third ring 3.

Further, from the viewpoint of the seal performance of the lower surface 34 of the third ring 3, a surface roughness Rz of the lower surface 34 may be 8 μm or less. Thus, reducing of the roughness of the lower surface 34 of the third ring 3 can enhance the seal performance of the lower surface 34. Additionally, Rz is a maximum height prescribed in JIS B 0601. Further, the third ring 3 may be formed of a resin material. The third ring 3 is made of a resin and reduced in weight, which can reduce the inertial force of the third ring 3. This can reduce the lifting of the third ring 3, and can enhance the seal performance of the lower surface 34.

In the above-described embodiment, the piston 20 is integrally molded by casting or forging, but the piston 20 may be configured so that a separate land portion is assembled. For example, a ring-shaped member may be assembled to the piston, as the land portion. The member of the land portion is formed of a high-strength material, which can decrease an axial length of the land portion.

The suitable embodiment of the present invention has been described above, and various forms described above can be combined as much as possible.

REFERENCE SIGNS LIST 100, 200: spark ignition engine
110, 210: combination structure of piston and piston rings
120, 220: combination of piston rings
10: cylinder
20: piston
30: combustion chamber
40: crank chamber
1: top ring (example of first compression ring)
2: second ring (example of second compression ring)
3: third ring (example of third compression ring)
4: oil ring

The invention claimed is:

1. A combination structure of a piston and piston rings in a spark ignition engine, comprising the piston fitted in a cylinder in the spark ignition engine and a combination of a plurality of piston rings assembled to the piston, the combination of the plurality of piston rings including:
a first compression ring assembled at a position closest to a combustion chamber, a second compression ring assembled at a position close to the combustion chamber next to the first compression ring, an oil ring assembled at a position farthest from the combustion chamber, and a third compression ring assembled at a position between the second compression ring and the oil ring, wherein an axial width of the first compression ring is $h1(1)$, an axial width of the second compression ring is $h1(2)$, an axial width of the third compression ring is $h1(3)$, and an axial width of the oil ring is $h1(4)$, wherein $h1(1) \geq h1(2)$ and $h1(1) \geq h1(3)$,
wherein $h1\ (TOTAL) = h1(1) + h1(2) + h1(3) + h1(4)$, $10\ mm \geq h1(TOTAL) \geq 3.1\ mm$,
the piston has an outer peripheral surface that is formed with a first ring groove in which the first compression ring is fitted, a second ring groove in which the second compression ring is fitted, a third ring groove in which the third compression ring is fitted, and an oil ring groove in which the oil ring is fitted,
wherein a length from an end face of the first ring groove on a combustion chamber side to an end face of the oil ring groove on a crank chamber side in an axial direction of the piston is Lp, wherein $Lp \geq 5.1$ mm,
wherein a length, in the axial direction of the piston, of a second land portion that is a region defined between the first ring groove and the second ring groove in the outer peripheral surface of the piston is Lp2, and a length, in the axial direction of the piston, of a fourth land portion that is a region defined between the third ring groove and the oil ring groove is Lp4, wherein $Lp2 > Lp4$, and
wherein a tension of the first compression ring is $Ft(1)$, a tension of the second compression ring is $Ft(2)$, a tension of the third compression ring is $Ft(3)$, a tension of the oil ring is $Ft(4)$, and a diameter of a cylinder bore of the spark ignition engine is d1, $Ft(1) > Ft(3)$, and
wherein $Ft(TOTAL) = Ft(1) + Ft(2) + Ft(3) + Ft(4)$, $0.68\ N/mm \geq Ft(TOTAL)/d1$.

2. The combination structure of the piston and the piston rings according to claim 1, wherein an inclination angle of an axial end face of the third compression ring relative to a plane orthogonal to an axis of the piston is a torsional angle, the torsional angle indicates a positive value in a case where the axial end face inclines on a combustion chamber side toward outside in a radial direction, and the torsional angle indicates a negative value in a case where the axial end face inclines on a crank chamber side toward outside in the radial direction, the torsional angle of the third compression ring is $20' \pm 40'$ in a state where the third compression ring is assembled to the piston and the piston is fitted in the cylinder.

3. The combination structure of the piston and the piston rings according to claim 1, wherein the third compression ring has an outer peripheral surface formed in a tapered shape or a tapered undercut shape.

4. The combination structure of the piston and the piston rings according to claim 1, wherein $1.8\ mm \geq h1(1)$, $1.2\ mm \geq h1(2)$, and $1.0\ mm \geq h1(3)$.

5. The combination structure of the piston and the piston rings according to claim 1, wherein the oil ring includes a pair of segments that are formed annularly along a circumferential direction of the oil ring and that are provided independently of each other and side by side in an axial direction of the oil ring, and a spacer expander that is disposed between the pair of segments.

6. The combination structure of the piston and the piston rings according to claim 1, wherein a length, in the axial direction of the piston, of a third land portion that is a region defined between the second ring groove and the third ring groove in the outer peripheral surface of the piston is Lp3, $Lp3 \geq Lp4$, $Lp3 \geq 0.5$ mm, and wherein $Lp4 \geq 0.5$ mm.

7. The combination structure of the piston and the piston rings according to claim 1, wherein a volume of a second space that is a space surrounded by the piston, the cylinder, the first compression ring and the second compression ring is V2, and a volume of a fourth space that is a space surrounded by the piston, the cylinder, the third compression ring and the oil ring is V4, wherein $V2 > V4$.

8. The combination structure of the piston and the piston rings according to claim 1, wherein a volume of a fourth space that is a space surrounded by the piston, the cylinder, the third compression ring, and the oil ring is V4, a diameter of a cylinder bore of the spark ignition engine is d1 and $Vp = (d1/2)^2 \times \pi \times Lp$, wherein $V4/Vp \geq 0.00027$.

9. A combination structure of a piston and piston rings in a spark ignition engine, comprising the piston fitted in a cylinder in the spark ignition engine and a combination of a plurality of piston rings assembled to the piston, the combination of the plurality of piston rings including:
a first compression ring assembled at a position closest to a combustion chamber, a second compression ring assembled at a position close to the combustion chamber next to the first compression ring, an oil ring assembled at a position farthest from the combustion chamber, and a third compression ring assembled at a position between the second compression ring and the oil ring, wherein an axial width of the first compression ring is $h1(1)$, an axial width of the second compression ring is $h1(2)$, an axial width of the third compression ring is $h1(3)$, and an axial width of the oil ring is $h1(4)$, wherein $h1(1) \geq h1(2)$ and $h1(1) \geq h1(3)$,
wherein $h1\ (TOTAL) = h1(1) + h1(2) + h1(3) + h1\ (4)$, $10\ mm \geq h1\ (TOTAL) \geq 3.1\ mm$,
the piston has an outer peripheral surface that is formed with a first ring groove in which the first compression ring is fitted, a second ring groove in which the second compression ring is fitted, a third ring groove in which the third compression ring is fitted, and an oil ring groove in which the oil ring is fitted,
wherein a length from an end face of the first ring groove on a combustion chamber side to an end face of the oil ring groove on a crank chamber side in an axial direction of the piston is Lp, wherein Lp≥5.1 mm,
wherein a length, in the axial direction of the piston, of a second land portion that is a region defined between the first ring groove and the second ring groove in the outer peripheral surface of the piston is Lp2, and a length, in the axial direction of the piston, of a fourth land portion that is a region defined between the third ring groove and the oil ring groove is Lp4, wherein Lp2>Lp4, and wherein 1.8 mm≥h1(1), 1.2 mm≥h1(2), and 1.0 mm≥h1(3).

10. The combination structure of the piston and the piston rings according to claim 9, wherein an inclination angle of an axial end face of the third compression ring relative to a plane orthogonal to an axis of the piston is a torsional angle, the torsional angle indicates a positive value in a case where the axial end face inclines on a combustion chamber side toward outside in a radial direction, and the torsional angle indicates a negative value in a case where the axial end face inclines on a crank chamber side toward outside in the radial direction, the torsional angle of the third compression ring is 20'±40' in a state where the third compression ring is assembled to the piston and the piston is fitted in the cylinder.

11. The combination structure of the piston and the piston rings according to claim 9, wherein the third compression ring has an outer peripheral surface formed in a tapered shape or a tapered undercut shape.

12. The combination structure of the piston and the piston rings according to claim 9, wherein the oil ring includes a pair of segments that are formed annularly along a circumferential direction of the oil ring and that are provided independently of each other and side by side in an axial direction of the oil ring, and a spacer expander that is disposed between the pair of segments.

13. The combination structure of the piston and the piston rings according to claim 9, wherein a length, in the axial direction of the piston, of a third land portion that is a region defined between the second ring groove and the third ring groove in the outer peripheral surface of the piston is Lp3, Lp3≥Lp4, Lp3≥0.5 mm, and wherein Lp4≥0.5 mm.

14. A combination structure of a piston and piston rings in a spark ignition engine, comprising the piston fitted in a cylinder in the spark ignition engine and a combination of a plurality of piston rings assembled to the piston, the combination of the plurality of piston rings including:
a first compression ring assembled at a position closest to a combustion chamber, a second compression ring assembled at a position close to the combustion chamber next to the first compression ring, an oil ring assembled at a position farthest from the combustion chamber, and a third compression ring assembled at a position between the second compression ring and the oil ring, wherein an axial width of the first compression ring is h1(1), an axial width of the second compression ring is h1(2), an axial width of the third compression ring is h1(3), and an axial width of the oil ring is h1(4), wherein h1(1)≥h1(2) and h1(1)≥h1(3),
wherein h1 (TOTAL)=h1(1)+h1(2)+h1(3)+h1(4), 10 mm≥h1 (TOTAL)≥3.1 mm,
the piston has an outer peripheral surface that is formed with a first ring groove in which the first compression ring is fitted, a second ring groove in which the second compression ring is fitted, a third ring groove in which the third compression ring is fitted, and an oil ring groove in which the oil ring is fitted,
wherein a length from an end face of the first ring groove on a combustion chamber side to an end face of the oil ring groove on a crank chamber side in an axial direction of the piston is Lp, wherein Lp≥5.1 mm,
wherein a length, in the axial direction of the piston, of a second land portion that is a region defined between the first ring groove and the second ring groove in the outer peripheral surface of the piston is Lp2, and a length, in the axial direction of the piston, of a fourth land portion that is a region defined between the third ring groove and the oil ring groove is Lp4, wherein Lp2>Lp4, and
wherein a volume of a fourth space that is a space surrounded by the piston, the cylinder, the third compression ring, and the oil ring is V4, a diameter of a cylinder bore of the spark ignition engine is d1 and $Vp=(d1/2)^2 \times \pi \times Lp$, wherein V4/Vp≥0.00027.

15. The combination structure of the piston and the piston rings according to claim 14, wherein the third compression ring has an outer peripheral surface formed in a tapered shape or a tapered undercut shape.

16. The combination structure of the piston and the piston rings according to claim 14, wherein the oil ring includes a pair of segments that are formed annularly along a circumferential direction of the oil ring and that are provided independently of each other and side by side in an axial direction of the oil ring, and a spacer expander that is disposed between the pair of segments.

17. The combination structure of the piston and the piston rings according to claim 14, wherein a length, in the axial direction of the piston, of a third land portion that is a region defined between the second ring groove and the third ring groove in the outer peripheral surface of the piston is Lp3, Lp3≥Lp4, Lp3≥0.5 mm, and wherein Lp4≥0.5 mm.

18. The combination structure of the piston and the piston rings according to claim 14, wherein a volume of a second space that is a space surrounded by the piston, the cylinder, the first compression ring and the second compression ring is V2, and wherein V2>V4.

* * * * *

UNITED STATES PATENT AND TRADEMARK OFFICE
CERTIFICATE OF CORRECTION

PATENT NO. : 12,000,491 B2
APPLICATION NO. : 18/026144
DATED : June 4, 2024
INVENTOR(S) : Hiroyuki Nagakura et al.

Page 1 of 1

It is certified that error appears in the above-identified patent and that said Letters Patent is hereby corrected as shown below:

In the Claims

At Column 13, Line 36, "h1 (TOTAL)" should be -- h1(TOTAL) --.

At Column 14, Line 58, "h1 (TOTAL)=h1(1)+h1(2)+h1(3)+h1 (4)," should be -- h1(TOTAL)=h1(1)+h1(2)+h1(3)+h1(4), --.

At Column 14, Line 59, "h1 (TOTAL)" should be -- h1(TOTAL) --.

At Column 16, Line 6, "h1 (TOTAL)" should be -- h1(TOTAL) --.

At Column 16, Line 7, "h1 (TOTAL)" should be -- h1(TOTAL) --.

Signed and Sealed this
Twenty-fifth Day of March, 2025

Coke Morgan Stewart
*Acting Director of the United States Patent and Trademark Office*